(12) United States Patent
Haddadi (10) Patent No.: US 10,288,906 B2
(45) Date of Patent: May 14, 2019

(54) DEVICE AND METHOD FOR DETERMINING A WRITING OR READING MODE

(71) Applicant: ESSILOR INTERNATIONAL (COMPAGNIE GENERALE D'OPTIQUE), Charenton-le-Pont (FR)

(72) Inventor: Ahmed Haddadi, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 201 days.

(21) Appl. No.: 15/031,965

(22) PCT Filed: Oct. 23, 2014

(86) PCT No.: PCT/FR2014/052699
§ 371 (c)(1),
(2) Date: Apr. 25, 2016

(87) PCT Pub. No.: WO2015/059417
PCT Pub. Date: Apr. 30, 2015

(65) Prior Publication Data
US 2016/0274381 A1   Sep. 22, 2016

(30) Foreign Application Priority Data

Oct. 25, 2013 (FR) ...................... 13 60460

(51) Int. Cl.
*G02C 11/00* (2006.01)
*G08B 21/18* (2006.01)

(52) U.S. Cl.
CPC .............. *G02C 11/10* (2013.01); *G08B 21/18* (2013.01); *G02C 2202/24* (2013.01)

(58) Field of Classification Search
CPC ............... G02C 7/10; G02C 7/02; G02C 7/14
See application file for complete search history.

(56) References Cited

U.S. PATENT DOCUMENTS

| 6,325,508 | B1* | 12/2001 | Decreton | G02C 7/02 |
| | | | | 351/158 |
| 2008/0151175 | A1* | 6/2008 | Gross | G02C 7/086 |
| | | | | 351/45 |
| 2013/0229645 | A1 | 9/2013 | Suzuki et al. | |

FOREIGN PATENT DOCUMENTS

| CN | 2370437 | 3/2000 |
| CN | 202067376 | 12/2011 |

(Continued)

OTHER PUBLICATIONS

International Search Report and Written Opinion issued in PCT/FR2014/052699, dated Feb. 6, 2015.

(Continued)

*Primary Examiner* — Luke D Ratcliffe
(74) *Attorney, Agent, or Firm* — Norton Rose Fulbright US LLP (57) ABSTRACT

The invention relates to a device for determining a writing or reading mode of a person wearing spectacles including a frame and two lenses, the device comprising, according to the invention, means for measuring the distance between an element of the frame or the head and a working plane, means for measuring an angle of inclination (α) of a median plane of the two lenses relative to the vertical in a vertical median plane (P) of the head perpendicular to the median plane, and control means suitable for comparing the measured angle of inclination (α) with a set angle of inclination and for determining a reading mode or a writing mode of the person according to the comparison, the reading mode being associated with a predetermined set reading distance, and the writing mode being associated with a predetermined set writing distance.

19 Claims, 4 Drawing Sheets

(56) References Cited

FOREIGN PATENT DOCUMENTS

| | | |
|---|---|---|
| CN | 103293530 | 9/2013 |
| EP | 1087252 | 3/2001 |
| JP | 2000250304 | 9/2000 |
| JP | 2001-133741 | 5/2001 |
| JP | 2002-328134 | 11/2002 |
| WO | WO 2008/078320 | 7/2008 |
| WO | WO 2009/024681 | 2/2009 |
| WO | WO 2012/036638 | 3/2012 |
| WO | WO2013/065731 | 4/2015 |

OTHER PUBLICATIONS

Office Action with English Translation Issued in Corresponding Chinese Application No. 201480058634.0, dated Apr. 17, 2018.
Office Action with English Translation Issued in Corresponding Japanese Application No. 2016-526057, dated Jul. 17, 2018.
Office Action in Corresponding Japanese Patent Application No. 2016-526057, dated Oct. 23, 2018 (English Translation).

\* cited by examiner

DEVICE AND METHOD FOR DETERMINING A WRITING OR READING MODE

CROSS-REFERENCE TO RELATED APPLICATIONS

This application is a national phase application under 35 U.S.C. § 371 of International Application No. PCT/FR2014/052699 filed 23 Oct. 2013, which claims priority to French Patent Application No. 1360460 filed 25 Oct. 2014. The entire contents of each of the above-referenced disclosures is specifically incorporated by reference herein without disclaimer.

The present invention relates to a device for determining a reading or writing mode of an individual wearer of spectacles. This invention relates to the field of visual equipment, and more particularly concerns spectacles including corrective eyeglasses for near vision. The invention also relates to a method for determining a reading or writing mode of the wearer of spectacles by means of said device.

Generally, it is recognized that an individual wearer of spectacles is liable to aggravate their visual defect if he does not observe rules of good behavior when, for example, reading or writing. It has in particular been observed that certain wearers of spectacles have the tendency to position themselves unreasonably close to the reading and/or writing plane, in particular during work of prolonged duration. It is also known that myopia is generally the result of a complex process that progresses during life. In particular, continued and repeated exposure to bad near-vision working conditions (unsuitable posture, insufficient illumination, etc.), in addition to a congenital myopia (present at birth) or not, promotes the development of myopia because the eye is more greatly strained due to the increase of the vergence angle and the accommodation of the eye. This is particularly important in the case where the wearer of spectacles is a schooled child having many daily activities that demand near-vision work.

Devices mounted on spectacle frames measuring the distance between the frame and the working plane fixated by the wearer do exist. For example, EP 1 087 252 A1 describes a spectacle frame provided with range-finding means for measuring the distance between a lens of the frame and a point fixated by the wearer, and an alarm triggered by the range-finding means when the distance measured is smaller than a setpoint distance. For example, the range-finding means include an infrared-emitting diode and a sensor sensitive to the infrared, and are contained in a housing that is fixed to the bridge of the spectacles.

However, this type of device does not take into account the fact that the point fixated by the wearer of spectacles may consist of a horizontal working plane such as the top of a table or a desk, by a computer screen, or by an object held in the hands of the wearer, such as a book or an electronic apparatus having a screen. Thus, the angles of incidence may be large and vary substantially. In particular, this device is not suitable for distinguishing between a reading mode and a writing mode. Also, the described device does not take into account the fact that the wearer of spectacles may be right-handed or left-handed, this leading to constraints related to the posture of the wearer.

The objective of the present invention is to remedy the aforementioned drawbacks by providing an ergonomic and compact measuring device allowing a precise and reliable measurement of the working (reading, observation and/or writing) distance to be obtained. This makes it possible to alert the wearer of a bad near-vision posture whatever the nature of the plane fixated by the wearer. The invention also provides a measuring method implemented by means of the device according to the invention.

The present invention meets this objective by providing a device for determining a reading or writing mode of an individual wearer of spectacles comprising a frame and two eyeglasses, the device comprising:

means for measuring the distance between an element of the frame or of the head and a working plane;

means for measuring an angle of inclination of a mean plane of the two eyeglasses relative to the vertical in a vertical median plane of the head perpendicular to the mean plane; and controlling means able to compare the measured angle of inclination to a setpoint angle of inclination and to determine a reading mode or a writing mode of the individual depending on the comparison, the reading mode being associated with a predetermined reading setpoint distance, and the writing mode being associated with a predetermined writing setpoint distance.

By virtue of this device, it is possible to distinguish between the reading mode and the writing mode, in order to allow the posture of the individual in these modes to be evaluated distinctively.

The expression "mean plane of the two eyeglasses" may, equivalently, also mean the mean plane of the two rims of the frame framing the eyeglasses in the context of this description.

An "element of the head" may consist of an anatomical point of the head (for example the eye rotation center, the pupil, the commissures of the eyes, the forehead, etc.) in relation to the frame. The position relative to the frame may be predetermined (for example, by a statistical estimation) or measured (for example, by a two- or three-dimensional measuring system).

Advantageously, the device is intended to be securely fastened to the spectacle frame. The term "securely fastened" means added to the frame by means, for example, of a clip or more generally a removable holder, or incorporated directly into the frame, for example into one of the temples of the frame. Thus, the individual wearer of spectacles does not need to adopt a constrained posture that is likely to make him uncomfortable but, in contrast, may behave naturally as he would normally when carrying out his everyday activities.

Preferably, the means for measuring distance being suitable for measuring the distance between the mean plane of the two eyeglasses of the frame and a working plane. The means for measuring distance may, for example, be fixed to or incorporated into one of the temples of the spectacles.

The means for measuring distance may also be located in the working plane, for example in proximity to the writing or reading plane. For example, the means for measuring distance may be integrated into an electronic reading medium such as a tablet.

Preferably, the device furthermore comprises warning means, triggered by the controlling means when:

in reading mode, the measured distance is smaller than a predetermined reading setpoint distance; and/or in writing mode, the measured distance is smaller than a predetermined writing setpoint distance.

The warning means may be integrated into the spectacle frame or into the reading medium, such as an electronic tablet.

Thus, by virtue of this device, the wearer of spectacles is alerted as soon as he gets too close to the writing or reading plane in order to allow him to correct his posture, independently of his working (reading or writing) mode. A good near-vision distance to the working plane makes it possible not to promote the progress of myopia in particular or other visual defects such as hypermetropia.

Advantageously, the controlling means are able to distinguish between the reading mode and the writing mode depending on a predetermined threshold angle of inclination if the measured angle of inclination is larger than the setpoint angle of inclination, the reading mode being associated with an angle of inclination smaller than the predetermined threshold angle of inclination and larger than the setpoint angle of inclination, and the writing mode being associated with an angle of inclination larger than the predetermined threshold angle of inclination.

Preferably, the device furthermore comprises means for measuring a luminance value of the reading and/or writing plane, wherein the warning means are triggered by the controlling means when the measured luminance value is lower than a setpoint luminance value function of the measured distance and the writing or reading mode in which the individual wearer of spectacles is found.

The wearer of spectacles is thus alerted as soon as the luminance of his working plane or the ambient illumination is not sufficient for correct vision, given the writing or reading distance.

Advantageously, the means for measuring distance comprise two emitters arranged, in the vertical plane, with a non-zero angle between their main emission axes, and a receiver arranged so as to be able to receive the signal emitted by at least one of the two emitters and reflected by the working plane.

This arrangement of the measuring means allows a particularly precise and robust detection of the reflected signal, even if the signal is emitted with a large angle of incidence to the working plane in the vertical plane.

In one embodiment, the mean plane of the two eyeglasses of the frame is arranged with a pantoscopic angle comprised generally between 8° and 10° relative to the vertical. Advantageously, the means for measuring distance are arranged with an angle of their main axes comprised between 0° and 20° relative to the mean plane of the two eyeglasses of the frame, in the vertical plane perpendicular to the mean plane of the eyeglasses.

According to one variant, the means for measuring distance are arranged with an angle of horizontal tilt δ of their main axes comprised between −45° and 0° relative to the straight line orthogonal to the mean plane of the two eyeglasses of the frame. Advantageously, the angle of horizontal tilt δ is adjustable depending on the shape and/or morphology of the individual wearer of spectacles.

Preferably, the means for measuring the angle of inclination comprise an inclinometer and/or an accelerometer.

According to one embodiment, the device according to the invention furthermore comprises communicating means able to communicate with an exterior recording and/or displaying device.

According to embodiments, the warning means comprise at least one of a visual alarm, an audio alarm and a vibrator, in which the visual alarm is visible to the wearer and/or to a person other than the wearer.

Preferably, the device furthermore comprises recording means able to record the measured distances, the measured luminance value of the working plane and/or the number of triggerings of the warning means.

Advantageously, the values of the writing and/or reading setpoint distances and/or the luminance setpoint value are personalizable.

The present also also relates to a method for determining a reading or writing mode of an individual wearer of spectacles by means of a device according to the invention, the method comprising the following steps:
measuring the working distance between the mean plane of the two eyeglasses of the frame and said working plane;
measuring the angle of inclination of the mean plane of the two eyeglasses relative to the vertical in said vertical plane;
comparing the measured angle of inclination to a setpoint angle of inclination; and
determining a reading mode or a writing mode of the individual depending on the comparison, the reading mode being associated with a predetermined reading setpoint distance, and the writing mode being associated with a predetermined writing setpoint distance.

Advantageously, the method according to the invention furthermore comprises the step of:
triggering a warning in order to warn the wearer to correct his posture, depending on the writing or reading mode, if said measured distance is smaller than a predetermined setpoint distance.

Preferably, the method according to the invention furthermore comprises the steps of:
determining a parameter of movement of the head if the angle of inclination is larger than the setpoint angle of inclination during a predetermined duration; and
distinguishing, if said movement parameter is lower than a threshold movement value, between the reading mode and the writing mode depending on the threshold angle of inclination, the reading mode being associated with an angle of inclination smaller than the threshold angle of inclination and larger than the setpoint angle of inclination, and the writing mode being associated with an angle of inclination larger than the threshold angle of inclination.

Delaying the determination of the parameter of movement of the head makes it possible to avoid triggering the warning when an object passes for a short while in front of the spectacle frame of the person and thus bothering the person. Furthermore, measurement of the movement parameter makes it possible to ascertain whether the person is actually in the process of reading or writing. Distance measurements are carried out only if the wearer of spectacles is actually in reading or writing mode, in order to allow the electrical power resources of the device to be effectively managed.

According to one variant, the reading mode is associated with an additional reading setpoint distance and the writing mode is associated with an additional writing setpoint distance, the method furthermore comprising the step of triggering the warning when the measured distance is smaller than the largest value between the reading/writing setpoint distance and the additional reading/writing setpoint distance, respectively, so that the intensity and/or frequency of the trigger vary proportionally as a function of the measured reading/writing distance between the setpoint distance and the additional reading/writing setpoint distance, respectively.

This makes it possible to inform the wearer of spectacles to what extent he is too close to the working plane.

Advantageously, the method furthermore comprises the steps of:

recording data, the data comprising the measured reading and/or writing distances, the measured luminance value and/or the number of triggerings of the warning; and communicating the recorded data to an exterior recording and/or displaying device.

Preferably, the method according to the invention furthermore comprises the step of communicating in real-time data to an exterior recording and/or displaying device, the data comprising the measured reading and/or writing distances, the measured luminance value and/or the number of triggerings of the warning.

The invention and its advantages will be better understood with a view to the following description of embodiments of the invention, which embodiments are given by way of example and with reference to the appended figures, in which.

For the example described in the detailed description below, it is assumed that the means for measuring distance are integrated into (fixed to or incorporated into) the spectacle frame.

Figure 1:
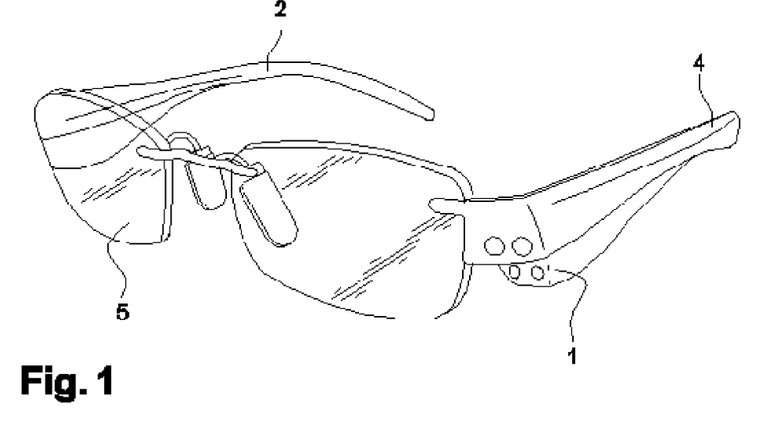
FIG. 1 shows, by way of example, a spectacle frame one temple of which is equipped with a device for determining a reading or writing mode according to the invention.

According to a first aspect, the present invention provides a device for determining a reading or writing mode of a wearer of spectacles, which is intended to be securely fastened to a spectacle frame. For example, the spectacles may comprise at least one corrective lens for correcting myopia. FIG. 1 shows, by way of example, a spectacle frame 4 comprising eyeglasses 5, and one temple 2 of which is equipped with the device 1 according to the invention. The device 1 may also be placed on top of the rims of the frame 4 framing the eyeglasses 5, or indeed on the bridge of the frame 4.

Figure 2:
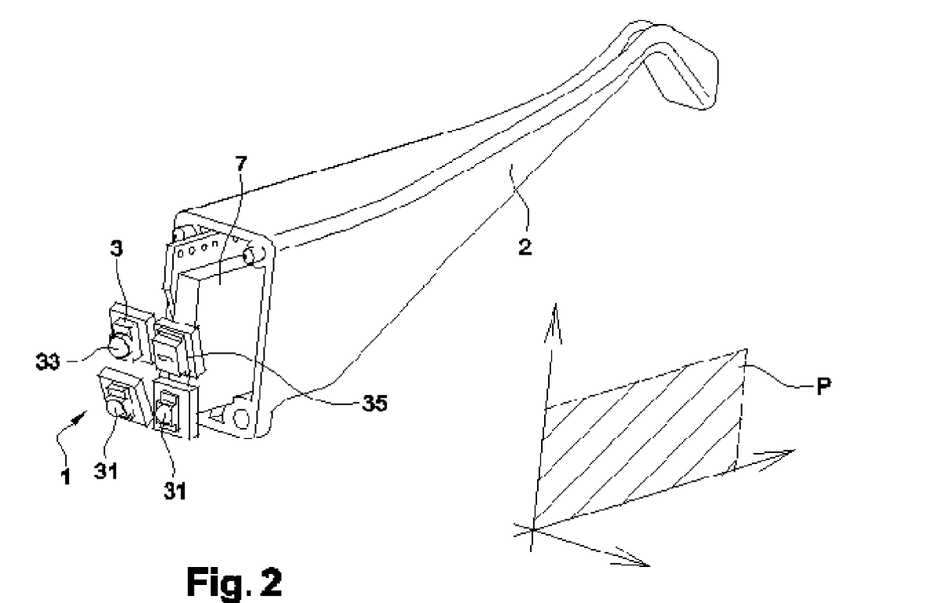
FIG. 2 shows a spectacle frame temple equipped with a device according to one embodiment of the invention.

FIG. 2 shows a spectacle frame 4 temple 2 equipped with a device 1 according to one embodiment of the invention. The device 1 comprises means for measuring the distance between an element of the frame or of the head and a working plane. In the illustrated example, the means for measuring distance are means 3 for measuring the distance between a mean plane 10 of the two eyeglasses of the frame 4 (or of the two rims of the frame 4) (see FIG. 4) and a working plane 12 (see FIGS. 3A and 3B). These means are also called range-finding means 3. The working plane 12 is a plane in which a book, a document or a screen is located on which the spectacle wearer is reading or writing. The working plane may consist of a reading plane, such as a book or a notepad held in the hands of the spectacle wearer. The working plane may also consist of a writing plane, such as a table on which a notepad is placed. The reading plane and the writing plane may be identical or different.

The means 3 for measuring distance comprise two emitters 31 and a receiver 33 (or sensor) arranged so as to be able to receive the signal emitted by at least one of the two emitters 31 and reflected by the working plane. The range-finding means 3 may comprise, for example, two infrared-emitting diodes and a sensor sensitive to the infrared. The emitting diodes 31 may emit with a certain emission cone, and the sensor 33 may have a certain reception cone.

In the embodiment in FIG. 2, the device 1 furthermore comprises means 35 for measuring a luminance value of the writing or reading plane. The means 35 for measuring a luminance value of the working plane may consist, for example, of a photodiode having a sensitivity to visible light similar to that of the human eye. The relationship between the illuminance E and luminance L for a Lambertian surface of reflectance $\rho$ is written $L = E\rho/\Pi$.

Furthermore, the device 1 comprises a battery 7 for supplying electrical power to the various components of the device. The battery may be rechargeable, for example by means of a micro-USB connector cable.

The embodiment in FIG. 2, which comprises two emitters 31 and a receiver 33, has the advantage of a particularly robust and precise detection of the reflected signal, because the sensors are placed convergent on the working plane. Their positions and orientations are adjustable depending on the morphology of the face of the individual wearer and/or the shape of the frame 4. The plane P is the median vertical plane of the head of the individual. This plane P is orthogonal to the facial plane.

The device for determining a reading or writing mode according to the invention also comprises warning means (not shown). According to embodiments, the warning means may comprise a visual alarm, such as an (optionally flashing) light-emitting diode, an audio alarm, a vibrator, or a combination of a plurality of these means. These warning means may also consist in sending a message to an operator, possibly for example a parent or an optician. The visual alarm may be visible to the wearer or to another person, implying that the visual alarm may be arranged on the interior or on the exterior of the spectacle frame 4. The visual alarm has the advantage of being discreet and may therefore easily be used by a child wearer of spectacles in a classroom.

Figure 3A:
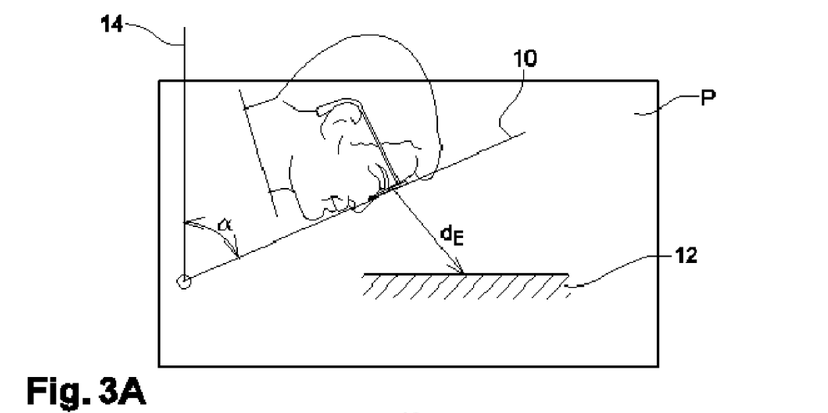
FIG. 3A illustrates a wearer of spectacles in writing mode.
Figure 3B:
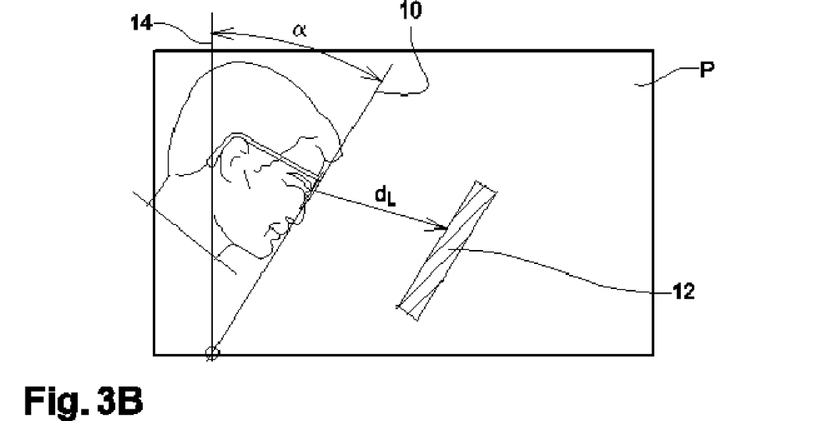
FIG. 3B illustrates a wearer of spectacles in reading mode.

The device according to the invention furthermore comprises means (not shown) for measuring an angle of inclination of the mean plane of the two eyeglasses (or of the two rims of the frame) in the vertical plane P. According to preferred embodiments of the invention, the means for measuring the angle of inclination comprise an inclinometer and/or an accelerometer. These measuring means thus make it possible to measure angles relative to the horizontal, and especially the angle of inclination of the head of the person. The angle of inclination $\alpha$ and the vertical plane P are illustrated in FIGS. 3A and 3B. The vertical plane P corresponds to the plane of the figure. The angle of inclination $\alpha$ is measured between the vertical 14 and the plane 10 of the eyeglasses of the frame 4. The angle of inclination $\alpha$ thus corresponds to an angle of inclination of the head of the wearer of spectacles. The angle of inclination $\alpha$ may, for example, be comprised in a range running from 30° to 80°, and will preferably be in the neighborhood of 70° when the person is looking at a horizontal writing or reading plane 12, as illustrated in FIG. 3A. When the person is looking at an inclined reading plane 12 such as a book held in his hands, the angle of inclination $\alpha$ of the head may, for example, be comprised in a range running from 0° to 45°, and will preferably be in the neighborhood of 35°.

The device according to the present invention also comprises controlling means (not shown) able to distinguish between a reading mode and a writing mode. This distinction is made, by the controlling means, via a comparison of the angle of inclination α to a threshold value of the angle of inclination. In one embodiment, the controlling means determine whether the angle of inclination α is larger than a predetermined setpoint angle of inclination. If this is the case, and if the angle of inclination α is smaller than the threshold angle of inclination, the controlling means determine that the wearer of spectacles is in reading mode. If the angle of inclination α is larger than the threshold angle of inclination, the controlling means determine that the wearer of spectacles is in writing mode.

The controlling means may, for example, comprise a microprocessor. The reading mode is associated with a reading setpoint distance, and the writing mode is associated with a writing setpoint distance. The values of the reading setpoint distance and the writing setpoint distance may be identical or different. For example, the writing and reading setpoint distances may be about 40 cm. Alternatively, the value of the reading setpoint distance may be higher than the value of the writing setpoint distance.

FIGS. 3A and 3B illustrate writing and reading modes, respectively. The threshold angle of inclination of the plane 10 of the eyeglasses may, for example, be about 20° relative to the vertical 14. In this example, if the angle of inclination is smaller than 20°, the person is in writing mode, this corresponding to a posture suitable for writing on a horizontal working plane. If the angle of inclination is larger than 20°, the person is in reading mode.

In the device according to the present invention, the warning means are triggered by the controlling means when the measured distance in reading mode is smaller than the reading setpoint distance, and/or when the measured distance in writing mode is smaller than the writing setpoint distance. Thus, when the distance to the working plane is too small for near vision, the wearer of spectacles is warned by the warning means, and he is invited to move further away from the working plane by modifying his posture, in order to stop the operation of the warning means. According to one embodiment, the means for measuring luminance are coupled to the warning means, which are then triggered by the controlling means when the measured luminance value is lower than a luminance setpoint value function of the writing or reading distance, respectively. For example, the luminance setpoint value may be higher if the distance to the working plane is smaller, and less high if the distance to the working plane is larger. The warning means may still be triggered even if the setpoint distance depending on the mode in which the person is found is respected.

Figure 4:
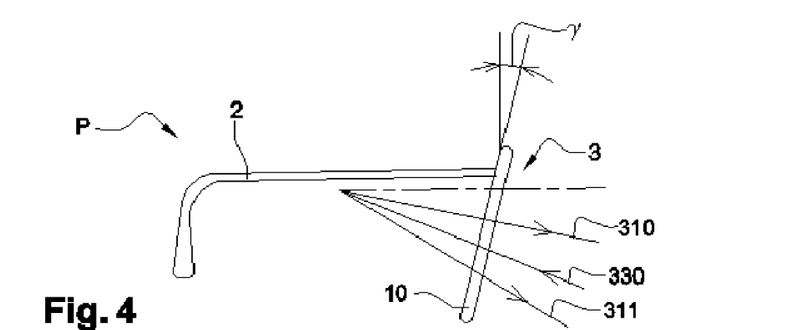
FIG. 4 schematically shows an exemplary angular arrangement of means for measuring distance of the device according to one embodiment, seen from the side.

FIG. 4 shows an exemplary angular arrangement of the means 3 for measuring distance, relative to the plane 10 of the eyeglasses of the frame 4 seen from the side. In this example, the means 3 for measuring distance are arranged such that their main emission or reception axes make an angle comprised between 0° and 20° to the straight line orthogonal to the mean plane 10 of the two eyeglasses (or of the two rims) of the frame 4, in the vertical plane P (which corresponds to the plane of the figure). The main axis 310 of the first emitting diode is oriented perpendicularly to the mean plane 10 of the eyeglasses of the frame 4, this corresponding to 0°. The main axis 310 of the first diode coincides with the straight line orthogonal to the main plane 10 of the two eyeglasses. The main axis 311 of the second emitting diode is orientated at 20° relative to the main axis 310 of the first emitting diode. The receiving diode is arranged so that its main axis 330 is orientated at 10° relative to the main axis 310, intermediate between the emission directions of the emitting diodes.

With reference to FIG. 4, the plane 10 of the eyeglasses is typically arranged with a pantoscopic angle γ of about 10° relative to the vertical 14, thereby making it possible for the gaze of the person to be perpendicular to the mean plane of the two eyeglasses.

Figure 5:
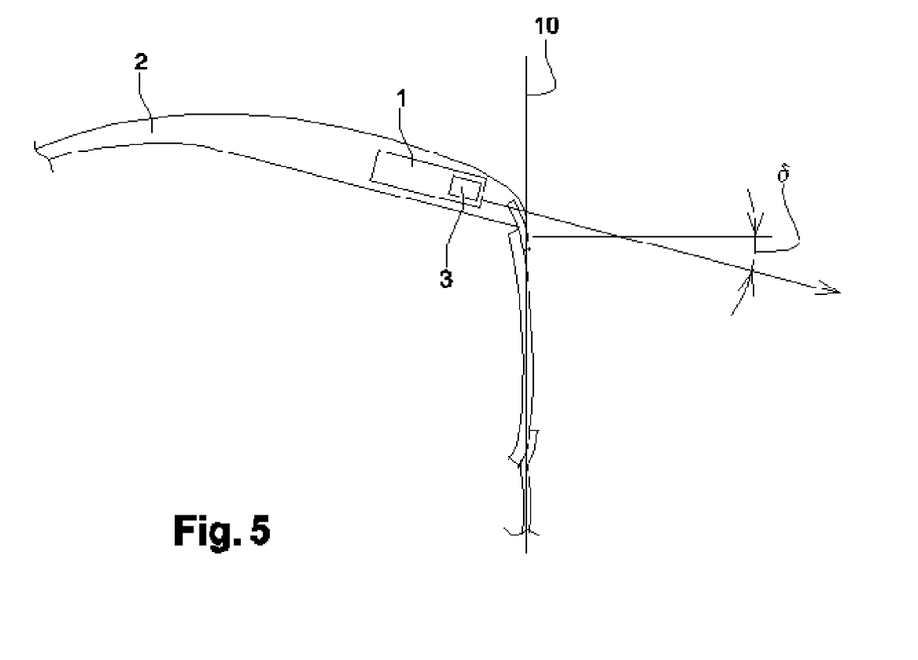
FIG. 5 shows an exemplary arrangement of a set of means for measuring distance of the device for determining a reading or writing mode relative to the mean plane of two eyeglasses (or two rims of the frame) of a spectacle frame.

In a particularly preferred embodiment, the device according to the invention comprises two sets of means 3 for measuring reading and/or writing distance. For example, each temple 2 of the spectacle frame 4 may be equipped with two emitting diodes and a sensor such as described above. FIG. 5 shows an exemplary arrangement of a set of means 3 for measuring distance of the device 1 relative to the mean plane 10 of the two eyeglasses 5 of a spectacle frame 4. The set of means 3 for measuring distance may, for example, be arranged with an angle of horizontal tilt δ comprised in a range running from −45° to 0°, and preferably with an angle in the neighborhood of −30°, relative to the straight line orthogonal to the mean plane 10 of the two eyeglasses (or the two rims) of the frame 4. Thus, the measuring means 3 are arranged convergently relative to the nasal zone of the individual wearer of spectacles. Advantageously, the angle of horizontal tilt δ of the sensors may be adjustable depending on the shape and/or morphology of the individual.

Advantageously, the device according to one embodiment furthermore comprises communicating means (not shown) in order to communicate with an exterior recording and/or displaying device (not shown). The communication may be carried out, for example, via a micro-USB connector cable or a wireless (Bluetooth, etc.) connection. The device may also comprise recording means (not shown) for recording the measured reading and/or writing distances, the measured luminance value and/or the number of triggerings of the warning means. The recording means may consist, for example, of a memory card.

Preferably, parameters such as the values of the reading and/or writing setpoint distances, the threshold value of the angle of inclination and/or the luminance setpoint value are personalizable. For example, the optician or medical ophthalmologist may adjust one or more of these values by means of his computer connected to the device according to the embodiments by a micro-USB connector cable or a wireless (Bluetooth, etc.) connection. It is then possible to take account of the fact that each spectacle-wearing person adopts a posture that is unique to them when carrying out near-vision work.

The device 1 according to the invention may be mounted on or integrated into one of the temples 2 of the frame 4 of the spectacles. For example, the device may be removably or durably fixed to one of the temples 2 of the frame 4. The device may also be integrated into one of the temples 2 of the frame 4, as illustrated in FIG. 2. As described above, it is also possible to equip each of the two temples 2 of the frame 4 with the device 1.

Advantageously, the device 1 according to the invention is mounted on the temple 2 of the frame 4 on the side opposite to the writing hand of the wearer of spectacles. Thus, correct operation of the device is not hindered by the writing hand of the wearer and the measurements of reading and/or writing distances may be carried out correctly.

The device according to the embodiments described above has the advantages of being compact, light and inexpensive. The device makes it possible to measure the distances to the working plane with a precision of about one centimeter, even with large angles of incidence. The device is also suitable for meeting constraints related to the postures of right-handed and left-handed wearers.

Figure 6:
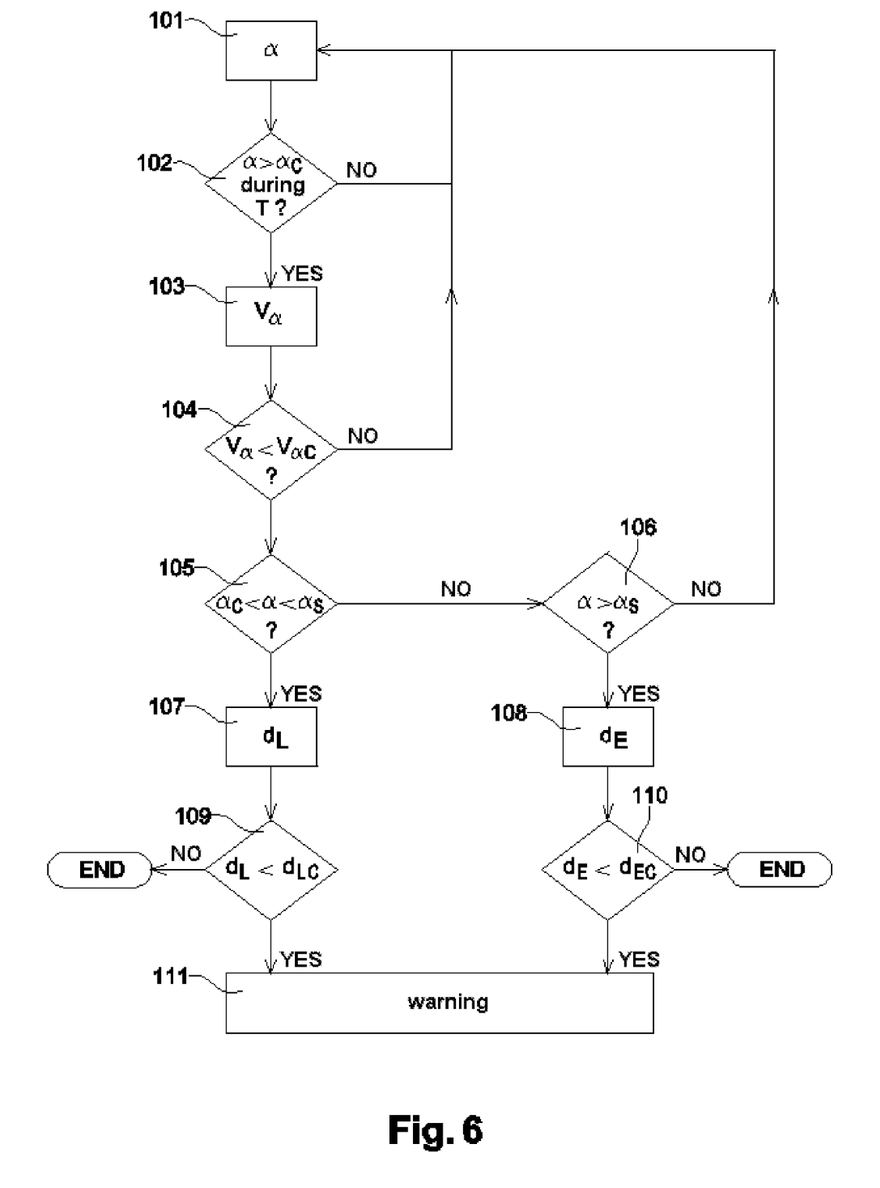
FIG. 6 shows a succession of steps implemented in a method for determining a reading or writing mode of a wearer of spectacles according to the invention.

According to a second aspect, the present invention relates to a method for determining a reading or writing mode of a wearer of spectacles by means of a device according to the embodiments described above. One embodiment of the method is schematically shown in FIG. 6 and comprises the following steps. The angle of inclination α of the mean plane of the two eyeglasses is measured (step 101). It is determined (step 102) whether the angle of inclination α is larger than a setpoint angle of inclination $\alpha_c$ during a preset duration T. The setpoint angle of inclination $\alpha_c$ may, for example, be about −10° relative to the vertical. This delay makes it possible to avoid triggering a warning when an object passes for a short while in front of the spectacle frame of the person. For example, the predetermined duration T may be about 10 to 30 seconds approximately.

If the angle of inclination α is larger than the setpoint angle of inclination $\alpha_c$ during the predetermined duration T, a parameter $v_\alpha$ of movement of the position and/or orientation of the head is then determined (step 103). This determination may be carried out, for example, by an accelerometer or a gyrometer integrated into the device according to the first aspect of the invention or, alternatively, integrated into the spectacle frame.

The parameter $v_\alpha$ of movement of the position and/or orientation of the head may comprise, for example, the speed of the movement associated with a yaw angle, a pitch angle and/or a roll angle of the head.

The measurement of the parameter of the movement of the head makes it possible to ascertain whether the person is actually in the process of reading or writing. Specifically, when the head of the person moves a lot and/or rapidly, it is unlikely that the person is carrying out reading or writing work. Thus, measurements of working distance $d_t$ are carried out only if the wearer of spectacles is actually in writing or reading mode, in order to allow electrical power resources, the lifetime of the battery for example, to be effectively managed.

If the parameter of movement of the head is lower than a threshold movement value, a distinction is made between a reading mode and a writing mode depending on the threshold angle of inclination $\alpha_S$ (steps 105 and 106). As described above, the reading mode is associated with an angle of inclination α smaller than the threshold angle of inclination $\alpha_S$ and larger than the setpoint angle of inclination $\alpha_c$ and with a reading setpoint distance $d_{LC}$, and the writing mode is associated with an angle of inclination α larger than the threshold angle of inclination $\alpha_S$ and with a writing setpoint distance $d_{EC}$.

If the person is in reading mode, the reading distance $d_L$ is measured between the mean plane of the two eyeglasses and the reading plane (step 107). Similarly, if the person is in writing mode, the writing distance $d_E$ is measured between the mean plane of the two eyeglasses (or of the two rims of the frame) and the writing plane (step 108). If it is determined that the measured distance $d_L$, $d_E$, depending on the mode, is smaller than the reading or writing setpoint distance $d_{LC}$, $d_{EC}$ (steps 109 and 110, respectively), a warning is triggered in order to warn the wearer to correct his posture (step 111).

In one embodiment, the reading mode is associated with an additional reading setpoint distance and the writing mode is associated with an additional writing setpoint distance. The method then furthermore comprises the step of triggering the warning when the measured reading/writing distance is smaller than the largest value between the reading/writing setpoint distance and the additional reading/writing setpoint distance, respectively. The intensity and/or the frequency of the triggering vary proportionally depending on the measured reading/writing distance between the setpoint distance and the additional reading/writing setpoint distance, respectively. For example, the reading setpoint distance may be 29 cm, and the additional reading setpoint distance may be 24 cm. The alarm is then triggered when the measured distance is smaller than 29 cm, and may consist of a discontinuous audio signal of a certain frequency. The frequency of the audio signal increases when the measured distance decreases between 29 cm and 24 cm. When the measured distance is smaller than 24 cm, the audio signal may be continuous.

Preferably, the method according to the invention furthermore comprises recording data. The data may comprise the measured reading and/or writing distances, the measured luminance value and/or the number of triggerings of the warning, and the associated dates and/or times. The recorded data may also be communicated to an exterior recording and/or displaying device, such as a computer, for example by means of a micro-USB connector cable or a wireless connection. Thus, the data may be recorded and sent to the computer of the optician or medical ophthalmologist who is monitoring the spectacle-wearing person.

Alternatively, the data may be communicated in real-time to the exterior recording and/or displaying device.

Thus, the optician or medical ophthalmologist will be able to monitor the behavior of the wearer of spectacles. For example, the number or frequency of the triggerings of the alarm may be indications of a progressive myopia of the patient. The optician or medical ophthalmologist will then be able to adapt the alert thresholds to better manage the posture of the individual with respect to the working plane, or their optical prescription, depending on the circumstances.

The method according to the embodiments described above may be carried out independently of the nature of the reading and/or writing plane. For example, the reading and/or writing plane (or medium) may consist of paper or of a screen of a computer such as a tablet computer. Equivalently, the device according to the embodiments described above is suitable for use with any type of working medium.

The method according to the embodiments described above may especially be applied to a child who has hypermetropia or myopia following continuous and repeated exposure to bad near-vision working conditions (unsuitable posture, insufficient illumination, etc.), and to decrease the progression of the associated visual defect.

It will be noted that the device and method according to the embodiments may also be used by emmetropic individuals (without visual defects) by way of preventive tools.

The invention claimed is:

1. A device for determining a reading or writing mode of an individual wearer of spectacles comprising a frame and two eyeglasses, the device comprising:
   means for measuring the distance between an element of the frame or of the head and a working plane;
   wherein the device further comprises:
   means for measuring an angle of inclination (a) of a mean plane of the two eyeglasses relative to the vertical in a vertical median plane (P) of the head perpendicular to the mean plane; and
   controlling means comprising a microprocessor able to compare the measured angle of inclination (a) to a setpoint angle of inclination which has been recorded in said microprocessor and to determine a reading mode or a writing mode of the individual depending on the comparison, the reading mode being associated with a predetermined reading setpoint distance, and the writing mode being associated with a predetermined writing setpoint distance;
wherein the means for measuring distance comprise two emitters arranged, in said vertical plane (P), with a non-zero angle between their main emission axes, and a receiver arranged so as to be able to receive the signal emitted by at least one of the two emitters and reflected by the working plane.

2. The device of claim 1, the device being securely fastened to the spectacle frame, the means for measuring distance being suitable for measuring the distance between the mean plane of the two eyeglasses of the frame and a working plane.

3. The device of claim 1, further comprising warning means, triggered by the controlling means when:
in reading mode, the measured distance is smaller than the predetermined reading setpoint distance; and/or
in writing mode, the measured distance is smaller than the predetermined writing setpoint distance.

4. The device of claim 3, further comprising means for measuring a luminance value of the reading and/or writing plane, wherein the warning means are triggered by the controlling means when the measured luminance value is lower than a setpoint luminance value function of the measured distance and the writing or reading mode in which the individual wearer of spectacles is found.

5. The device of claim 1, wherein the controlling means are able to distinguish between the reading mode and the writing mode depending on a predetermined threshold angle of inclination if the measured angle of inclination (a) is larger than the setpoint angle of inclination, the reading mode being associated with an angle of inclination (a) smaller than the predetermined threshold angle of inclination and larger than the setpoint angle of inclination, and the writing mode being associated with an angle of inclination (a) larger than the predetermined threshold angle of inclination.

6. The device of claim 3, further comprising means for measuring a luminance value of the reading and/or writing plane, wherein the warning means are triggered by the controlling means when the measured luminance value is lower than a setpoint luminance value function of the measured distance and the writing or reading mode in which the individual wearer of spectacles is found.

7. The device of claim 2, wherein the means for measuring distance are arranged with an angle of their main axes comprised between 0° and 20° relative to the mean plane of the two eyeglasses of the frame, in said vertical plane (P).

8. The device of claim 2, wherein the means for measuring distance are arranged with an angle of horizontal tilt δ of their main axes comprised between −45° and 0° relative to the straight line orthogonal to the mean plane of the two eyeglasses of the frame.

9. The device of claim 8, wherein the angle of horizontal tilt δ is adjustable depending on the shape and/or morphology of the individual wearer of spectacles.

10. The device of claim 1, wherein the means for measuring the angle of inclination comprise an inclinometer and/or an accelerometer.

11. The device of claim 1, further comprising communicating means able to communicate with an exterior recording and/or displaying device.

12. The device of claim 3, wherein the warning means comprise at least one of a visual alarm, an audio alarm and a vibrator, in which the visual alarm is visible to the wearer and/or to a person other than the wearer.

13. The device of claim 3, further comprising recording means able to record the measured distances, the measured luminance value and/or the number of triggerings of the warning means.

14. The device of claim 6, wherein the values of the writing and/or reading setpoint distances and/or the luminance setpoint value are personalizable.

15. A method for determining a reading or writing mode of an individual wearer of spectacles by means of a device of claim 1, the method comprising the following steps:
measuring the working distance between the element of the frame or of the head and the working plane;
measuring the angle of inclination ($\alpha$) of the mean plane of the two eyeglasses relative to the vertical in said vertical plane (P);
comparing the measured angle of inclination ($\alpha$) to a setpoint angle of inclination; and
determining a reading mode or a writing mode of the individual depending on the comparison, the reading mode being associated with a predetermined reading setpoint distance, and the writing mode being associated with a predetermined writing setpoint distance.

16. The method of claim 15, further comprising the step of:
triggering a warning in order to warn the wearer to correct his posture, depending on the writing or reading mode, if said measured distance is smaller than the predetermined setpoint distance.

17. The method of claim 15, further comprising the steps of:
determining a parameter ($v_\alpha$) of movement of the head if the angle of inclination ($\alpha$) is larger than the setpoint angle of inclination ($\alpha_c$) during a predetermined duration (T); and
distinguishing, if said movement parameter ($v_\alpha$) is lower than a threshold movement value ($v_{\alpha C}$), between the reading mode and the writing mode depending on the threshold angle of inclination ($\alpha_S$), the reading mode being associated with an angle of inclination ($\alpha$) smaller than the threshold angle of inclination ($\alpha_S$) and larger than the setpoint angle of inclination ($\alpha_c$), and the writing mode being associated with an angle of inclination ($\alpha$) larger than the threshold angle of inclination ($\alpha_S$).

18. The method of claim 16, further comprising the steps of:
recording data, the data comprising the measured reading and/or writing distances, the measured luminance value and/or the number of triggerings of the warning; and
communicating the recorded data to an exterior recording and/or displaying device.

19. The method of claim 16, further comprising the step of communicating in real-time data to an exterior recording and/or displaying device, the data comprising the measured reading and/or writing distances, the measured luminance value and/or the number of triggerings of the warning.

* * * * *

UNITED STATES PATENT AND TRADEMARK OFFICE
CERTIFICATE OF CORRECTION

PATENT NO.         : 10,288,906 B2
APPLICATION NO.    : 15/031965
DATED              : May 14, 2019
INVENTOR(S)        : Ahmed Haddadi Page 1 of 1

It is certified that error appears in the above-identified patent and that said Letters Patent is hereby corrected as shown below:

In the Claims

Claim 1, Column 10, Line 60:
Delete "(a)" and replace with -- ($\alpha$) --.

Claim 1, Column 10, Line 65:
Delete "(a)" and replace with -- ($\alpha$) --.

Claim 5, Column 11, Line 34:
Delete "(a)" and replace with -- ($\alpha$) --.

Claim 5, Column 11, Line 36:
Delete "(a)" and replace with -- ($\alpha$) --.

Claim 5, Column 11, Line 40:
Delete "(a)" and replace with -- ($\alpha$) --.

Signed and Sealed this
Thirteenth Day of August, 2019

Andrei Iancu
*Director of the United States Patent and Trademark Office*